United States Patent [19]

Pack

[11] 4,312,655
[45] Jan. 26, 1982

[54] DISPOSAL OF WASTE GLASS

[75] Inventor: Ernest A. Pack, Uxbridge, England

[73] Assignee: BHF Engineering Limited, Greenford, England

[21] Appl. No.: 139,678

[22] Filed: Apr. 14, 1980

[30] Foreign Application Priority Data

Aug. 15, 1979 [GB] United Kingdom ............... 28461/79
Dec. 13, 1979 [GB] United Kingdom ............... 43020/79

[51] Int. Cl.$^3$ ............................................. C03B 1/00
[52] U.S. Cl. ........................................ 65/28; 65/134; 65/159; 65/335; 100/170
[58] Field of Search ............... 65/134, 135, 136, 335, 65/28, 159; 72/246; 100/170

[56] References Cited

U.S. PATENT DOCUMENTS

| | | | |
|---|---|---|---|
| 2,823,535 | 2/1958 | Warner | 100/170 X |
| 3,196,615 | 7/1965 | Kautz | 100/170 X |
| 3,420,651 | 1/1969 | Martin | 65/159 X |
| 3,598,041 | 8/1971 | Noyer | 100/170 X |

*Primary Examiner*—Arthur D. Kellogg
*Attorney, Agent, or Firm*—Cushman, Darby & Cushman

[57] ABSTRACT

Molten waste glass and rejected hot glass bottles from glass moulding processes are flattened in an apparatus comprising two rollers independently driven for rotation in opposing directions and having a gap therebetween through which the hot glass fed to the apparatus can be flattened, the two rollers being urged towards each other in normal operation at least one of the rollers being pivotally mounted. In order to prevent jamming of the apparatus there are provided means for swinging the pivotally mounted roller away from its normal operating position in the event of a foreign object being accidentally dropped into the apparatus and in the event of a power failure. Also there may be provided with a cam such that by rotation of the cam the pivotally mounted roller can be moved and the normal operating gap between the rollers altered. The gap between the rollers can be altered according to the rate of glass feed, the nature of glass fed to the apparatus and the required size of cullet granules. Thereby maximum efficiency of the apparatus can be achieved over a great range of rates and types of glass feed.

20 Claims, 4 Drawing Figures

DISPOSAL OF WASTE GLASS

FIELD OF THE INVENTION

This invention relates to apparatus for use in the disposal of hot waste glass and the disposal of hot waste glass using such apparatus.

DESCRIPTION OF THE PRIOR ART

The disposal of hot waste glass, such as molten waste glass and rejected hot glass articles generated in glass moulding processes, has been a constant problem in the glass industry. Molten waste glass may for example be generated during a mould change in the form of glass gobs or during a machine stoppage in the form of streams of glass.

Conventional methods of dealing with molten waste glass have involved pouring the glass into a large tank of water and simply allowing the waste to accumulate in the bottom of the tank. To remove the glass from the tank it was necessary to smash it, e.g. with sledge hammers. If it was desired to recycle the waste glass, the smashed glass removed from the tank had to be crushed to form cullet, the form suitable for recycling to a molten glass furnace.

More recently waste molten glass and rejected hot glass articles have been treated in apparatus comprising two rollers independently driven for rotation in opposing directions and having a gap therebetween, the two rollers being normally urged towards each other. The waste glass fed to the apparatus is flattened between the rollers and then discharged into a tank of cold water. On entering the cold water, the flattened glass shatters to form cullet which can be recycled directly to the molten glass furnace without further crushing. Thus there is no requirement for the smashing of large amounts of cooled solidified glass. The cullet may be removed from the cold water tank by a conveyor inside the tank. The conveyor carries blades which push the cullet along the base of the tank to an outlet. Within the tank further granulation of the glass may occur as it is moved and thereby advantageously reducing the size of the cullet.

A practical problem however found during the use of such roller apparatus to flatten glass is that as well as the waste glass other articles, e.g. spanners, mould parts, may accidentally be fed to the apparatus. Although there may be possible some movement of the rollers away from each other this is generally not sufficient to allow passage between the rollers of a large foreign object. Accordingly if such foreign objects are inadvertently passed to the apparatus the whole apparatus may jam up.

Another problem associated with jamming occurs when there is a power failure. As will be appreciated if the drive to the rollers stops the apparatus will become jammed very quickly.

Further the prior art apparatus has tended to be inflexible in use. Maximum efficiency could only be obtained over a narrow range of glass feed rates and feed types. Further the size of the cullet granules into which the glass shatters in the cold water tank tends to be fixed whereas the desired cullet size for recycling to the glass furnace varies according for example to the glass type.

DESCRIPTION OF THE INVENTION

According to a first embodiment of the present invention there is provided apparatus for use in flattening hot waste glass comprising two rollers independently driven for rotation in opposing directions and having a gap therebetween through which hot glass fed to the apparatus can be flattened, the two rollers being normally urged towards each other, at least one of the rollers being pivotally mounted and being provided with means for swinging the roller about its pivotal mounting away from the other roller when the roller is forced a predetermined distance from its normal position.

In this way when a foreign body in the apparatus forces the roller the predetermined distance outwards from its normal position, the roller is caused to swing right out from its position to allow the foreign body to pass through the apparatus and thus avoid jamming. Preferably there is also provided means for returning the roller to its normal position so that when the foreign body has passed through the roller is swung back to its normal position to continue normal operation.

Although it is theoretically possible for both rollers to be pivotally mounted and provided with means for their swinging, this is generally unnecessary. Accordingly generally the first of the rollers has a fixed axis of rotation and the second is pivotally mounted and urged in normal operation towards the first roller.

According to a preferred embodiment the pivotally mounted roller is pneumatically urged towards its normal position. Thus the roller is suitably connected to the piston of a, preferably air, cylinder. In normal operation the said roller is urged towards the other roller by means of fluid (air) pressure acting on one side of the piston in the cylinder. On the roller being forced outwards as by for example a foreign object a switch is tripped and causes fluid then to be fed to the cylinder on the other side of the piston and thus causing the piston to move away from its normal position and the roller to be swung out. When the piston reaches a predetermined position in this direction a second switch is tripped causing fluid flow to revert to the cylinder on the first side of the piston which is thus returned to its normal position and with it the roller is returned to its normal position.

According to a second embodiment of the present invention there is provided apparatus for use in flattening hot waste glass comprising two rollers independently driven for rotation in opposing directions and having a gap therebetween through which hot glass fed to the apparatus can be flattened, the two rollers being normally urged towards each other, at least one of the rollers being pivotally mounted and being provided with means for swinging the roller about its pivotal mounting away from the other roller in the event of a failure of drive being imparted to the apparatus.

In this way it can be assured that in the event of a failure of drive being imparted to the rollers at least one of the rollers is swung away from the other thus avoiding jamming of the apparatus.

Again while it is theoretically possible to have both rollers movable in this way it is generally only necessary to have one. Thus generally a first of the rollers has a fixed axis of rotation and the second is pivotally mounted.

According to a preferred embodiment the pivotally mounted roller is pneumatically urged towards its normal position. The roller is connected to the piston of a, preferably air, cylinder. In normal operation the said roller is urged towards the other roller by means of fluid (air) pressure acting on one side of the piston in the cylinder, there being also provided means for diverting fluid in the event of a power failure to pass into the said cylinder on the other side of the piston. This causes the piston to move away from its normal position and the pivotally mounted roller thus to be swung away from the other roller. This position is retained until power is restored.

According to a third embodiment of the present invention there is provided apparatus for use in flattening hot waste glass comprising two rollers independently driven for rotation in opposing directions and having a gap therebetween through which hot glass fed to the apparatus can be flattened, the two rollers being normally urged towards each other and at least one of the rollers being pivotally mounted and provided with a cam such that by rotation of the cam the pivotally mounted roller can be moved and the normal operating gap between the rollers altered.

It has been found that in use of such apparatus the normal operating gap between the two rollers can be increased or decreased according to the amount and nature of the glass feed to the apparatus and the required size of cullet granules. Thus maximum efficiency and optimum cullet size for the subsequent melting process requirements may be achieved over a greater range of rates and types of glass feed leading to greater flexibility of use of the apparatus. With appropriate construction the adjustment of the cam and therefore of the gap width may be effected while the apparatus is running.

Once again it is theoretically possible for both rollers to be pivotally mounted and adjustable in the above manner but this is generally unnecessary.

Accordingly generally the first of the rollers has a fixed axis of rotation and the second is pivotally mounted and urged towards the first roller.

According to a preferred adjustment arrangement the pivotally mounted roller is mounted on a lever arm connected via the cam device to means for urging the pivotally mounted roller towards the fixed roller. The means for urging the roller (which may suitably be a pneumatic cylinder e.g. an air cylinder) may be joined to the lever arm of the pivotally mounted roller by an eccentric shaft. Suitably the shaft connects a pin on the lever arm and a surrounding clevis on the cylinder arm by passing through apertures provided therein; the shaft being mounted eccentrically with respect to the apertures in the clevis. Accordingly on rotation of the eccentric shaft within the clevis apertures the distance between the means for urging the roller and the lever arm is altered. Thus the arm is caused to pivot about its pivot point and alter the position of the roller and accordingly the size of the gap between the rollers.

The rotation of the eccentric shaft may be adjusted by means of a radially mounted handle. Turning of this handle will cause rotation of the shaft and therefore alteration of the roller gap. The handle may be fixed in any particular position thus maintaining a particular rotation of the eccentric shaft and therefore a particular roller gap size.

DETAILED DESCRIPTION OF INVENTION WITH REFERENCE TO DRAWINGS

The invention is illustrated with reference to the accompanying drawings in which.

Figure 1:
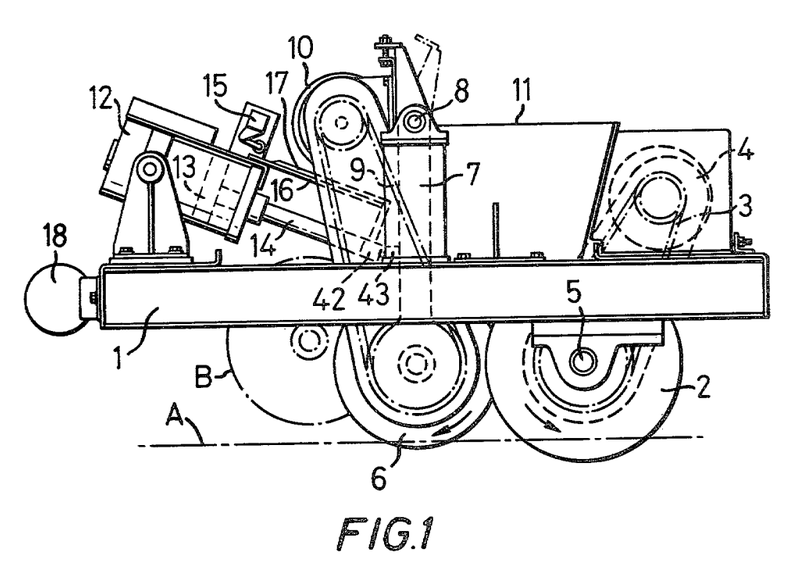
FIG. 1 is a general side view of apparatus according to the invention.

With reference to FIG. 1 of the drawings, the apparatus comprises a main frame 1 on which is mounted a first steel roller 2 having flanges at its edges. The roller 2 is driven via a chain 3 by an electric motor 4 to rotate in the direction indicated by the arrow about its fixed axis 5.

A second, unflanged, steel roller 6 is mounted on a support frame 7 which is pivotally mounted on main frame 1 at 8. Roller 6 is driven via a chain 9 by an electric motor 10 to rotate in the direction (opposite to that of roller 2) indicated by the arrow.

A hopper 11 is provided above the gap between the two rollers.

Also mounted on main frame 1 is an air cylinder 12, the piston 13 of which is urged in the right-hand direction of FIG. 1 in normal operation. The piston rod 14 is provided with a clevis 42 which is about a pin 43 extending from roller support frame 7. The connection of clevis 42 and pin 43 is more clearly shown in FIGS. 3 and 4 of the drawings. Piston rod 14 therefore in normal operation urges pivotally mounted roller 6 towards roller 2.

Mounted on top of cylinder 12 is a trip switch 15 under which passes one end of an actuator support bar 16, connected at its other end either to roller support frame 7 directly or (as shown) by means of being mounted on the end of piston rod 14. A predetermined distance along its length actuator support bar 16 has welded thereto an actuator bar 17. When actuator support bar 16 is caused to travel a predetermined distance towards the left as seen in FIG. 1 such that actuator bar 17 reaches switch 15 the switch is tripped.

Also mounted on main frame 1 is an air reservoir 18.

Also shown on FIG. 1 in broken line marked A and B respectively are the preferred level of water in the cold water tank in association with which the present apparatus is used and the position of roller 6 when swung out from its normal position.

Figure 2:
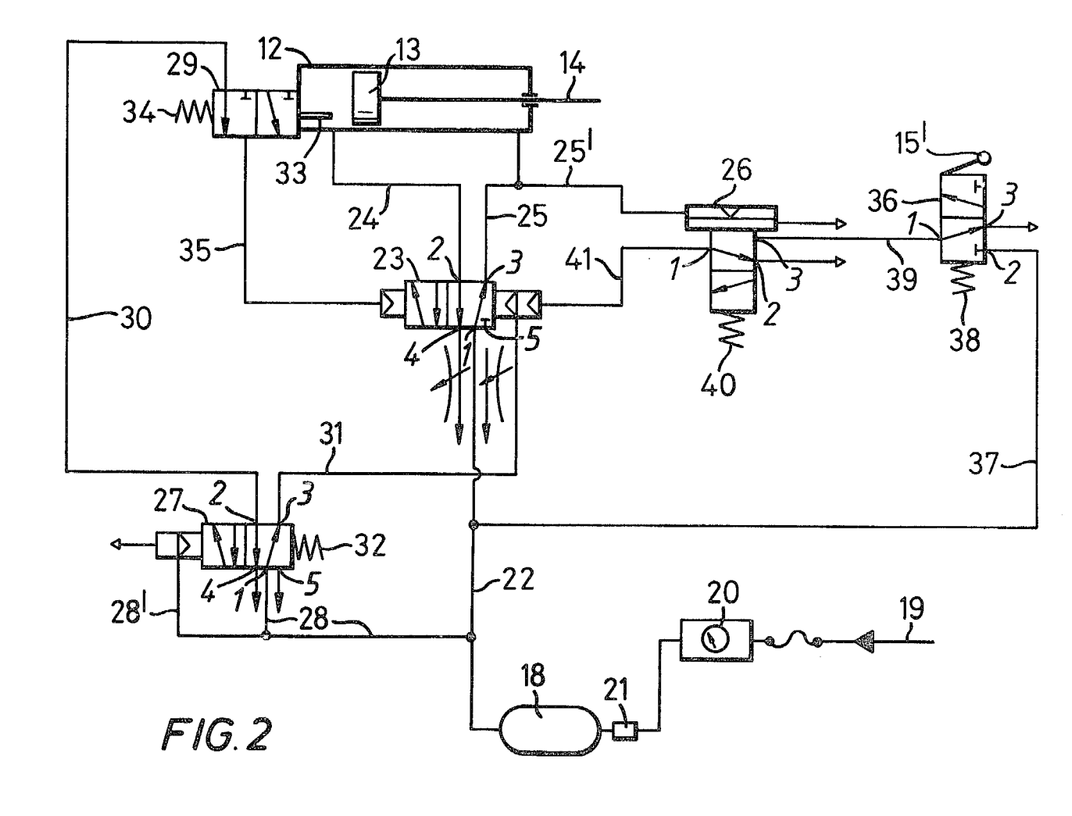
FIG. 2 is a schematic view of the pneumatic circuit of the apparatus of FIG. 1.

The pneumatic circuit of the apparatus of FIG. 1 is shown schematically in FIG. 2. Referring therefore to FIG. 2 of the drawings, there can be seen schematically represented the air cylinder 12 containing piston 13 with piston rod 14. Also shown are air reservoir 18 and, schematically, an actuator 15' of the trip switch 15.

Air from the main supply (not shown) enters the pneumatic circuit at 19 and passes through a pressure gauge 20, a non-return valve 21 into the air reservoir 18. In normal operation the air then passes through a main conduit 22 to the shown port 1 of a shuttle valve 23, through shuttle valve 23 and via a conduit 24 to the left-hand side of air cylinder 12. Thus air passes from the shown port 1 to port 2 of valve 23 (the opposite position from that shown in FIG. 2), to which port 2 the conduit 24 is connected. The right-hand side of the piston cylinder 12 is connected to the atmosphere via a conduit 25 through valve 23 and conduit 25 is also connected via a line 25' to a diaphragm valve 26.

There is also provided a solenoid valve 27 electrically connected (connections not shown) to the main drive circuit of the apparatus. Valve 27 in normal operating position is connected to a valve 29 on the air cylinder 12 via a conduit 30. The valve 27 is positioned then such that air may pass from the shown port 1 to port 2 connecting a conduit 28 and the conduit 30. This is the opposite position from that shown in FIG. 2. Conduit 28 leads from the main conduit 22 to the shown port 1 of the valve 27. The shown port 3 of valve 27 is connected via a conduit 31 to the right-hand side of the shuttle valve 23. Valve 27 is maintained in the normal operating position by means of air pressure applied along a line 28' from conduit 28 to the left-hand side of the valve. However a spring 32 is provided on the right-hand side of valve 27 biasing the valve in the opposite direction. Valve 27 is connected to the main drive circuit such that, in the event of an electrical failure, line 28' is cut off from conduit 28 and vented to the atmosphere.

The valve 29 mounted on air cylinder 12 carries a pin 33 which extends into the air cylinder chamber. Valve 29 is connected to the left-hand side as shown of shuttle valve 23 by a conduit 35. The valve 29 is normally biased towards the right-hand by means of a spring 34 mounted thereon (this is the position shown in FIG. 2). Thus in the normal position conduit 30 is cut off by valve 29 from the left-hand side of shuttle valve 23 as shown. However, when pin 33 and therefore the valve 29 are forced against the action of spring 34, the valve 29 is moved in a leftwardly direction as shown in FIG. 2 and conduit 30 becomes connected through valve 29 via a conduit 35 to the left-hand side of shuttle valve 23.

The actuator 15' of trip switch 15 is mounted on a valve 36, the shown port 2 of which is connected to main conduit 22 via line 37. Valve 36 carries a spring 38 which biases the valve upwardly (this position is the position shown in FIG. 2). On the other side of valve 36 from port 2 the shown port 1 is provided with a line 39 to port 3 of the diaphragm valve 26. In the normal operating position of valve 36, line 37 is sealed at port 2 and line 39 is connected to the atmosphere through valve 36 via ports 1 and 3 as shown.

Diaphragm valve 26 is in normal operating position urged upwardly (the opposite position from that shown in FIG. 2) by spring 40 such that line 39 is through valve 26 from port 3 to port 1 connected to a line 41 connected to the right-hand side of valve 23. In the position shown in FIG. 2 diaphragm valve 26 is urged against the biasing of spring 40 and line 41 is connected through valve 26, from port 1 to port 2, to the atmosphere.

Figure 3:
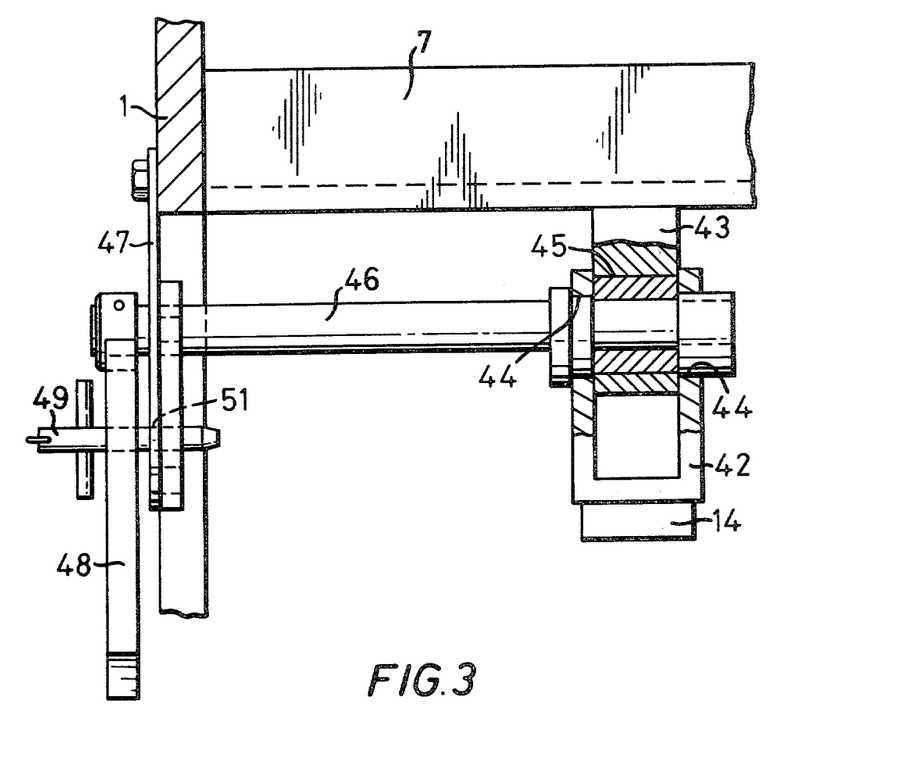
FIG. 3 is an enlarged plan view of the cam adjustment means of the apparatus of FIG. 1.
Figure 4:
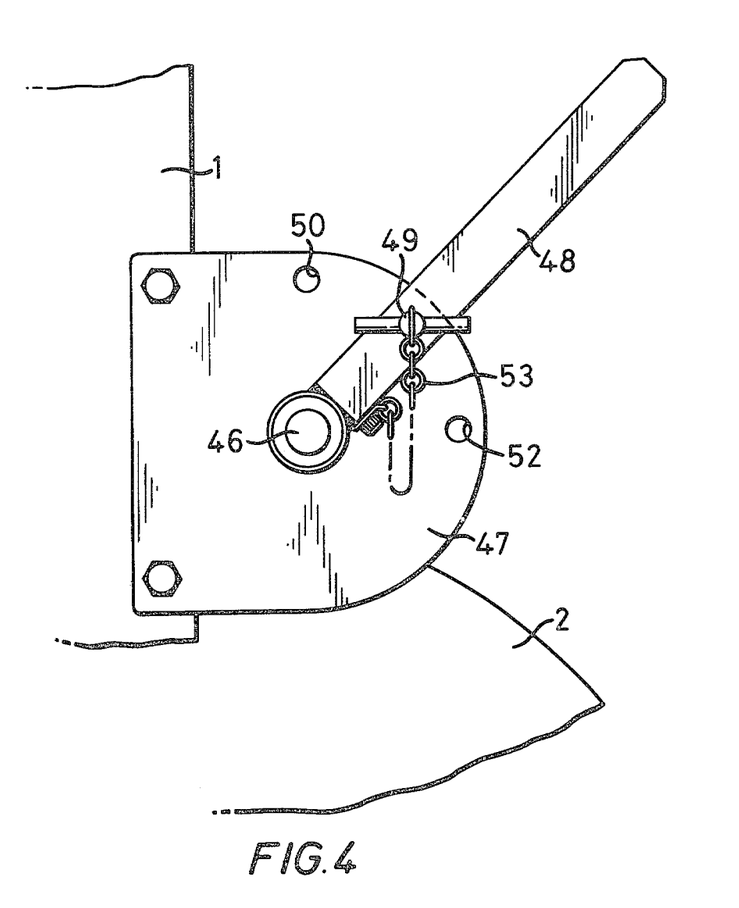
FIG. 4 is a side view of the adjustment means of FIG. 3.

The connection of clevis 42 and pin 43 is more clearly shown in FIGS. 3 and 4 of the drawings. Referring therefore to FIGS. 3 and 4, there is shown the clevis 42 on the piston rod 14 around the pin 43 on the roller support frame 7. The clevis 42 contains opposing apertures 44 and the pin 43 contains an aperture 45. A shaft 46 which is eccentric with respect to clevis apertures 44 passes through the clevis apertures and pin aperture 45 to join the roller support frame 7 and the piston rod 14.

Eccentric shaft 46 extends through the main frame 1 and a location plate 47 fixed thereto. On the other side shaft 46 is provided with a radially mounted handle 48. The position of this handle can be fixed by means of a pin 49 extending through the handle and into a respective spaced hole 50, 51 or 52 in the location plate 47. The pin 49 is secured against loss by a chain 53.

In use of the apparatus according to the present invention the steel rollers 2 and 6 are electrically driven by means of motors 4 and 10 and chains 3 and 9 respectively in the directions indicated in the arrows in FIG. 1. The bottoms of the two steel rollers are below the level of cold water in the cold water tank (as indicated by level A) used in association with the present invention. This ensures that the rollers are water cooled.

Molten waste glass, e.g. in the form of gobs or streams, from a glass-moulding process, and/or hot reject glass articles are fed to the hopper 11, e.g. from a delivery chute. Preferably water is flowed down the delivery chute to prevent the hot materials from sticking to the rollers. The waste glass from the hopper 11 is discharged to the gap between rotating rollers 2 and 6. In normal operation air cylinder 12 exerts a force on roller 6 urging it towards roller 2 and thus the glass is flattened as it passes between the rollers. Suitably at least one of the rollers carries a profiled surface so as even further to increase the surface to volume ratio of the flattened glass so that it may even better shatter when discharged into the cold water tank below the roller gap.

The force on the roller 6 is exerted by means of air in the left-hand side of cylinder 12 acting on the piston 13 to urge the piston and piston rod 14 towards the right as shown. Air from the main supply passes into the pneumatic circuit at 19 through pressure gauge 20 and non-return valve 21, air reservoir 18 and main conduit 22 through shuttle valve 23 (in the normal operating position) from ports 1 and 2 and along conduit 24 to the left-hand side of air cylinder 12 to act on piston 13. In this normal operating position the right-hand side of air cylinder 12 is connected through conduit 25 and valve 23 (via ports 3 and 5) to the atmosphere.

When a large foreign object is accidentally introduced into hopper 11 and falls between rollers 2 and 6 roller 6 is forced to pivot about its mounting 8 to swing a small distance to the left. Thus actuator support bar 16 connected to the roller 6 is also caused to move towards the left and pass under a trip switch 15. When the roller 6 and actuator support bar 16 have moved a predetermined distance the actuator 17 welded to bar 16 engages the trip switch 15 and the trip switch actuator 15' (as shown in FIG. 2) is forced downwards. Thus valve 36 on which actuator 15' is mounted is also forced downwards against the action of spring 38. This brings ports 2 and 1 of valve 36 into communication. In this way the main air supply conduit 22 becomes connected to the right-hand side of shuttle valve 23 via line 37, valve 36, line 39, diaphragm valve 26 (in which ports 1 and 3 are maintained in communication by means of the biasing of spring 40) and line 41.

The pulse of air, which thereby reaches shuttle valve 23, causes the shuttle valve to be reversed to the position shown in FIG. 2. Thus now port 1 of shuttle valve 23 is in communication with port 3 and therefore main conduit 22 connected through shuttle valve 23 to conduit 25 and the right-hand side of air cylinder 12. In addition port 2 of shuttle valve 23 is brought into communication with port 4. Thus the left-hand side of air cylinder 12 becomes connected to the atmosphere (via line 24 connected to port 2 of shuttle valve 23, port 4 being itself in communication with the atmosphere).

With valve 23 in this position air from the main air supply is introduced into the right-hand side of air cylinder 12, forcing piston 13 in a leftwardly direction and causing air from the other side (right-hand side) of the piston to be expelled to the atmosphere along conduit 24. Roller 6 which is mounted on the end of piston rod 14 is accordingly caused to pivot in a leftwardly direction around pivot point 8 and swing out from roller 2 to the position B indicated in FIG. 1. The gap between rollers 2 and 6 is thereby increased allowing the foreign object accidentally introduced from hopper 11 to fall between the rollers to avoid jamming.

When the roller 6 has been moved leftwardly to the position B, the leftward movement of piston 13 in air cylinder 12 is such that the piston is brought into contact with pin 33 on valve 29. The valve 29 is thus forced against the action of spring 34. This brings conduit 30 and conduit 35 into communication. Accordingly with valve 29 in this position a pulse of air from the main conduit 22 is caused to reach the left-hand side of shuttle valve 23 via conduit 28, solenoid valve 27 (ports 1 and 2 being in communication under the influence of air pressure applied to the left-hand side of the valve), along conduit 30, through valve 29 and along line 35.

This pulse of air causes shuttle valve 23 to revert to its normal operating position. Thus air is now supplied to the left-hand side of air cylinder 12 along main conduit 22 through valve 23 (ports 1 and 2 now being back in communication) and along conduit 24. Piston 13 is accordingly now urged in a rightwardly direction and air is forced out from the right-hand part of the cylinder along line 25' to diaphragm cylinder 26 where it acts on the diaphragm in opposition to spring 40 to move the valve to the position shown in FIG. 2 cutting off the supply of air to the right-hand side of shuttle valve 23 via lines 37 and 39. Diaphragm valve 26 is maintained in this position as piston 13 moves in a rightwardly direction and air is being forced out of the air cylinder 12. The movement of piston 13 causes roller 6 to be swung back to its normal position for normal operation of the apparatus to resume.

When the normal position of roller 6 has been regained there is no longer expulsion of air from the right-hand side of air cylinder 12 and therefore diaphragm valve 26 moves back to its normal position with ports 1 and 3 (and therefore lines 41 and 39) in communication. At the same time as roller 6 is swung back to its normal position actuator bar 17 is moved in a rightwardly direction out of contact with trip switch 15. Thus trip switch activator 15' on valve 36 is no longer forced downwardly against spring 38. Thus valve 36 returns to the normal operating position shown in FIG. 2 and supply from main conduit 22 along line 37 becomes cut off at port 2 of valve 36.

In the event of a power failure to the apparatus, solenoid valve 27, which is connected to the main electrical supply, is brought into operation. Air supply to the left-hand side of valve 27 along conduit 28' is ceased and thus the valve is no longer urged in a rightwardly direction against spring 32. Thus spring 32 takes over to force the valve 27 in a leftwardly direction to the positon shown in FIG. 2. Thus ports 1 and 3 of the valve 27 are brought into communication. Accordingly the main air supply conduit 22 is now connected to the right-hand side of shuttle valve 23 via line 28, through valve 27 and along conduit 31. This causes shuttle valve 23 to be moved to its non-operating position (as shown in FIG. 2) with ports 1 and 3 in communication. Accordingly the main air supply conduit 22 is brought into communication with the right-hand side of air cylinder 12 and the left-hand side of the cylinder vented to the atmosphere. Therefore again the piston 13 is forced to move in a leftwardly direction and roller 6 is swung out from roller 2 to prevent jamming.

The presence of air reservoir 18 and non-return valve 21 ensures that, in the event that there is also an air supply failure, there is sufficient air present in the pneumatic circuit for roller 6 to be swung out.

In the event that the rate of feed of waste glass to hopper 11 and/or the nature of the waste glass feed to hopper 11 is changed such that normal operation of the apparatus is no longer at maximum efficiency or it is desired to alter the cullet granule size, the normal gap between the rollers 2 and 6 is altered so that maximum efficiency is regained.

To alter the gap between rollers 2 and 6 the handle 48 is freed by removal of pin 49 and the handle rotated. Taking FIG. 4 rotation in an anti-clockwise direction results in a decrease of gap size and rotation in clockwise direction in an increase in gap size. In FIG. 4 three holes are shown, though of course more holes may be used if greater precision of adjustment is required. The handle is shown with a pin fixed in hole 51. If the handle is moved such that it is secured by pin 49 through hole 50, the gap is at a minimum. If the handle is moved to hole 52 maximum gap width is obtained.

Accordingly when it is desired to alter the gap width, pin 49 is removed, handle 48 rotated to the required position and the pin re-inserted and held in hole 50 or 52 in location plate 47. Rotation of handle 48 causes shaft 46 to rotate about its axis. The shaft 46 is eccentric with respect to the apertures in the clevis 42 on the piston rod 14 and accordingly the distance between the end of the piston rod and the roller support frame 7 to which pin 43 is attached is either lengthened or shortened respectively. This results in a reduction or increase in roller gap width as required.

This roller gap adjustment operation can be carried out while the apparatus is running.

Of course if the nature or rate of glass feed to the apparatus or the desired cullet granule size were to change again the gap width can be re-adjusted.

I claim:

1. In an apparatus for use in flattening hot waste glass comprising two rollers independently driven for rotation in opposing directions and having a gap therebetween, the two rollers being normally urged towards each other, means for feeding the hot waste glass to the gap between said rollers to flatten the waste glass, means for discharging the flattened waste glass, tank means for receiving the discharged glass and shattering the same to form cullet suitable for recycle directly to a molten glass furnace without further crushing, the improvement wherein at least one of the rollers is pivotally mounted and is provided with means for swinging the roller about its pivotal mounting away from the other roller when the roller is forced a predetermined distance from its normal position.

2. Apparatus according to claim 1 wherein the first of the rollers has a fixed axis of rotation and the second is pivotally mounted and urged in normal operation towards the first roller.

3. Apparatus according to claim 2 which comprises a pneumatic cylinder connected to the said second roller; fluid pressure acting in normal operation on one side of a piston in the cylinder to urge the second roller towards the first roller; and there being also provided means for applying fluid pressure to the other side of the piston in the cylinder when the second roller is forced a predetermined distance from the first roller to swing the second roller about its pivotal mounting away from the first roller.

4. Apparatus according to claim 3 wherein there is provided means for causing the fluid pressure to return to the said first side of the piston when the second roller has been swung a predetermined distance from the first roller to return the second roller to its normal position.

5. In an apparatus for use in flattening hot waste glass comprising two rollers independently driven for rotation in opposing directions and having a gap therebetween, the two rollers being normally urged towards each other, means for feeding the hot waste glass to the gap between said rollers to flatten the waste glass, means for discharging the flattened waste glass, tank means for receiving the discharged glass and shattering the same to form cullet suitable for recycle directly to a molten glass furnace without further crushing, the improvement wherein at least one of the rollers is pivotally mounted and is provided with means for swinging the roller about its pivotal mounting away from the other roller in the event of a failure of drive being imparted to the apparatus.

6. Apparatus according to claim 5 wherein the first of the rollers has a fixed axis of rotation and the second is pivotally mounted and urged in normal operation towards the first roller.

7. Apparatus according to claim 6 which comprises a pneumatic cylinder connected to the said second roller; fluid pressure acting in normal operation on one side of a piston in the cylinder to urge the second roller towards the first roller; and there being also provided means for applying fluid pressure to the other side of the piston in the cylinder in the event of a power failure to the apparatus to swing the second roller about its pivotal mounting away from the first roller.

8. In an apparatus for use in flattening hot waste glass comprising two rollers independently driven for rotation in opposing directions and having a gap therebetween, the two rollers being normally urged towards each other, means for feeding the hot waste glass to the gap between said rollers to flatten the waste glass, means for discharging the flattened waste glass, tank means for receiving the discharged glass and shattering the same to form cullet suitable for recycle directly to a molten glass furnace without further crushing, the improvement wherein a first of the rollers has a fixed axis of rotation and the second is pivotally mounted; said apparatus further comprising a pneumatic cylinder connected to the said second roller; fluid pressure acting in normal operation on one side of a piston in the cylinder to urge the second roller towards the first roller;

first means for applying fluid pressure to the other side of the piston in the cylinder when the second roller is forced a predetermined distance from the first roller to swing the second roller about its pivotal mounting away from the first roller;

means for causing the fluid pressure to return to the said first side of the piston when the second roller has been swung a predetermined distance from the first roller by said first means to return the second roller to its normal position; and second means for applying fluid pressure to the said other side of the piston in the cylinder in the event of a power failure to the apparatus to swing the second roller about its pivotal mounting away from the first roller.

9. In an apparatus for use in flattening hot waste glass comprising two rollers independently driven for rotation in opposing directions and having a gap therebetween, the two rollers being normally urged towards each other, means for feeding the hot waste glass to the gap between said rollers to flatten the waste glass, means for discharging the flattened waste glass, tank means for receiving the discharged glass and shattering the same to form cullet suitable for recycle directly to a molten glass furnace without further crushing, the improvement wherein at least one of the rollers is pivotally mounted and is provided with a cam such that by rotation of the cam the pivotally mounted roller can be moved and the normal operating gap between the rollers altered.

10. Apparatus according to claim 9 wherein the first of the rollers has a fixed axis of rotation and the second is pivotally mounted and urged towards the first roller.

11. Apparatus according to claim 10 wherein the pivotally mounted roller is mounted on a lever arm connected via the cam device to means for urging the pivotally mounted roller towards the fixed roller.

12. Apparatus according to claim 11 wherein the means for urging the roller is joined to the lever arm of the pivotally mounted roller by an eccentric shaft.

13. Apparatus according to claim 12 wherein the shaft connects a pin on the lever arm and a surrounding clevis on the means for urging the roller by passing through apertures provided therein; the shaft being mounted eccentrically with respect to the apertures in the clevis.

14. Apparatus according to claim 13 wherein the rotation of the eccentric shaft is adjustable by means of a radially mounted handle; there being provided means for fixing the handle at predetermined positions.

15. In an apparatus for use in flattening hot waste glass comprising two rollers independently driven for rotation in opposing directions and having a gap therebetween, the two rollers being normally urged towards each other, means for feeding the hot waste glass to the gap between said rollers to flatten the waste glass, means for discharging the flattened waste glass, tank means for receiving the discharged glass and shattering the same to form cullet suitable for recycle directly to a molten glass furnace without further crushing, the improvement wherein the two rollers are independelty driven for rotation in opposing directions and have a gap therebetween through which hot glass fed to the apparatus can be flattened, a first of the rollers having a fixed axis of rotation and the second being pivotally mounted on a lever arm, the apparatus further comprising;

a pneumatic cylinder connected to the said lever arm of the second roller; fluid pressure acting in normal operation on one side of a piston in the cylinder to urge the second roller towards the first roller;

first means for applying fluid pressure to the other side of the piston in the cylinder when the second roller is forced a predetermined distance from the first roller to swing the second roller about its pivotal mounting away from the first roller;

means for causing the fluid pressure to return to the said first side of the piston when the second roller has been swung a predetermined distance from the first roller by said first means to return the second roller to its normal position; and second means for applying fluid pressure to the said other side of the piston in the cylinder in the event of a power failure to the apparatus to swing the second roller about its pivotal mounting away from the first roller; the lever arm of the second roller being connected to the pneumatic cylinder by an eccentric shaft, the shaft connecting a pin on the lever arm and a surrounding clevis connected to the pneumatic cylinder by passing through apertures provided therein; the shaft being mounted eccentrically with respect to the apertures in the clevis such that rotation of the eccentric shaft causes the second roller to be moved and the normal operating gap between the rollers to be altered.

16. In a method of disposing of hot waste glass by providing an apparatus comprising two rollers independently driven for rotation in opposing directions and having a gap therebetween, the two rollers being normally urged towards each other, feeding the hot waste glass to the gap between said rollers to flatten the waste glass, discharging the flattened waste glass into a tank of cold water where the glass shatters to form cullet which can be recycled directly to a molten glass furnace without further crushing, the improvement which comprises using as the flattening apparatus one which comprises two rollers independently driven for rotation in opposing directions and having a gap therebetween through which hot glass fed to the apparatus can be flattened, the two rollers being normally urged towards each other, at least one of the rollers being pivotally mounted and being provided with means for swinging the roller about its pivotal mounting away from the other roller when the roller is forced a predetermined distance from its normal position.

17. In a method of disposing of hot waste glass by providing an apparatus comprising two rollers independently driven for rotation in opposing directions and having a gap therebetween, the two rollers being normally urged towards each other, feeding the hot waste glass to the gap between said rollers to flatten the waste glass, discharging the flattened waste glass into a tank of cold water where the glass shatters to form cullet which can be recycled directly to a molten glass furnace without further crushing, the improvement which comprises using as the flattening apparatus one which comprises two rollers independently driven for rotation in opposing directions and having a gap therebetween through which hot glass fed to the apparatus can be flattened, the two rollers being normally urged towards each other, at least one of the rollers being pivotally mounted and being provided with means for swinging the roller about its pivotal mounting away from the other roller in the event of a failure of drive being imparted to the apparatus.

18. In a method of disposing of hot waste glass by providing an apparatus comprising two rollers independently driven for rotation in opposing directions and having a gap therebetween, the two rollers being normally urged towards each other, feeding the hot waste glass to the gap between said rollers to flatten the waste glass, discharging the flattened waste glass into a tank of cold water where the glass shatters to form cullet which can be recycled directly to a molten glass furnace without further crushing, the improvement which comprises using as the flattening apparatus one which comprises two rollers independently driven for rotation in opposing directions and having a gap therebetween through which hot glass fed to the apparatus can be flattened, a first of the rollers having a fixed axis of rotation and the second being pivotally mounted; a pneumatic cylinder connected to the said second roller; fluid pressure acting in normal operation on one side of a piston in the cylinder to urge the second roller towards the first roller; first means for applying fluid pressure to the other side of the piston in the cylinder when the second roller is forced a predetermined distance from the first roller to swing the second roller about its pivotal mounting away from the first roller; means for causing the fluid pressure to return to the said first side of the piston when the second roller has been swung a predetermined distance from the first roller by said first means to return the second roller to its normal position; and second means for applying fluid pressure to the said other side of the piston in the cylinder in the event of a power failure to the apparatus to swing the second roller about its pivotal mounting away from the first roller.

19. In a method of disposing of hot waste glass by providing an apparatus comprising two rollers independently driven for rotation in opposing directions and having a gap therebetween, the two rollers being normally urged towards each other, feeding the hot waste glass to the gap between said rollers to flatten the waste glass, discharging the flattened waste glass into a tank of cold water where the glass shatters to form cullet which can be recycled directly to a molten glass furnace without further crushing, the improvement which comprises using as the flattening apparatus one which comprises two rollers independently driven for rotation in opposing directions and having a gap therebetween through which hot glass fed to the apparatus can be flattened, the two rollers being normally urged towards each other and at least one of the rollers being pivotally mounted and provided with a cam such that by rotation of the cam the pivotally mounted roller can be moved and the normal operating gap between the rollers altered.

20. In a method of disposing of hot waste glass by providing an apparatus comprising two rollers independently driven for rotation in opposing directions and having a gap therebetween, the two rollers being normally urged towards each other, feeding the hot waste glass to the gap between said rollers to flatten the waste glass, discharging the flattened waste glass into a tank of cold water where the glass shatters to form cullet which can be recycled directly to a molten glass furnace without further crushing, the improvement which comprises using as the flattening apparatus one which comprises two rollers independently driven for rotation in opposing directions and having a gap therebetween through which hot glass fed to the apparatus can be flattened, a first of the rollers having a fixed axis of rotation and the second being pivotally mounted on a lever arm; a pneumatic cylinder connected to the said lever arm of the second roller; fluid pressure acting in normal operation on one side of a piston in the cylinder to urge the second roller towards the first roller; first means for applying fluid pressure to the other side of the piston in the cylinder when the second roller is forced a predetermined distance from the first roller to swing the second roller about its pivotal mounting away from the first roller; means for causing the fluid pressure to return to the said first side of the piston when the second roller has been swung a predetermined distance from the first roller by said first means to return the second roller to its normal position; and second means for applying fluid pressure to the said other side of the piston in the cylinder in the event of a power failure to the apparatus to swing the second roller about its pivotal mounting away from the first roller; the lever arm of the second roller being connected to the pneumatic cylinder by an eccentric shaft, the shaft connecting a pin on the lever arm and a surrounding clevis connected to the pneumatic cylinder by passing through apertures provided therein; the shaft being mounted eccentrically with respect to the apertures in the clevis such that rotation of the eccentric shaft causes the second roller to be moved and the normal operating gap between the rollers to be altered.

* * * * *